United States Patent [19]
Thiel et al.

[11] Patent Number: 5,690,276
[45] Date of Patent: Nov. 25, 1997

[54] TWO STAGE THERMOSTATIC VALVE DEVICE

[75] Inventors: Peter Thiel, Bloomington; Don D. Hughes, Columbus; John F. Grote, Columbus, all of Ind.

[73] Assignee: Caltherm, Columbus, Ohio

[21] Appl. No.: 742,822

[22] Filed: Oct. 31, 1996

[51] Int. Cl.$^6$ ............................................. F01P 7/16
[52] U.S. Cl. ........................ 236/34.5; 137/630.15; 236/100
[58] Field of Search ............... 236/34, 34.5, 100, 236/99 J, 99 K, 93 A; 137/630.15

[56] References Cited

U.S. PATENT DOCUMENTS

| | | | |
|---|---|---|---|
| 2,844,323 | 7/1958 | Engstrom | 236/34.5 |
| 3,190,314 | 6/1965 | Visos et al. | 137/630.15 |
| 4,615,354 | 10/1986 | Bianchi | 137/630.14 |
| 5,238,185 | 8/1993 | Saur et al. | 236/34.5 |
| 5,549,244 | 8/1996 | Kai et al. | 236/34.5 |

*Primary Examiner*—William E. Tapolcai
*Attorney, Agent, or Firm*—Lane, Aitken & McCann

[57] ABSTRACT

A thermostat having a main valve and a secondary valve is disclosed both of which are biased closed by a single coiled compression spring and opened by a single piston. The entrance to the channel of the secondary valve is maintained at a maximum dimension of approximately 0.015 inches in order to keep undesirable particulate matter out of the valve. The surfaces within the valve channel encourage laminar flow which increases the volume of flow which can be passed through the valve while keeping the total surface area of the valve small.

21 Claims, 6 Drawing Sheets

TWO STAGE THERMOSTATIC VALVE DEVICE

This invention relates to an improved thermostatic device and more particularly a thermostatic valve device for use in liquid cooling systems of motor vehicles. The invention further relates to thermostatic devices having two valves which regulate fluid flow to a radiator system, a main valve and secondary valve.

BACKGROUND OF THE INVENTION

Thermostatic valve devices or thermostats are routinely used to control the flow of coolant circulating through the engine jacket and radiator systems of internal combustion engines. When the engine is cold the valves of the thermostat are closed thereby preventing coolant to flow from the engine jacket to the radiator. When the engine is started, the engine and the coolant contained therein are below the optimal operating temperature for the performance of the engine. As the engine warms up, heat is transferred to the coolant circulating through the engine block. When the coolant reaches a predetermined temperature, a heat sensitive element is actuated within the thermostat and causes the thermostat's valve to open. Opening of the valve allows coolant to enter the radiator system. The heated coolant from the engine displaces cooler fluid in the radiator and forces the cooler fluid from the radiator into the engine jacket. With the assistance of a water pump, the coolant is circulated through the engine jacket to cool the engine. In conventional thermostats the main thermostat valve has a relatively large cross section and when the valve is opened, a relatively large amount of fluid can rapidly rush through the valve and pass into the radiator. As the engine is cooled, the heat sensitive element within the thermostat senses the reduction in temperature and contracts. Contraction of the heat sensitive element allows a biasing spring to close the main valve. Many thermostats use a wax pellet as the heat sensitive device which responds to changes in the coolant's temperature by expanding or contracting. The response to temperature changes by the wax pellet is not immediate but is a gradual reaction which results in a lag time which elapses after the predetermined temperature is reached in the system and before the opening of the valve. As the engine is cooled, the contraction of the wax also involves a lag time between the temperature and the closing of the valves. Under ideal circumstances, it is preferred to minimize the lag time. The comparison of temperature and the opening and closing of the thermostat valve is often represented in a hysteresis curve. It is generally preferred to maintain the distance between the opening stroke and closing stroke as represented in a hysteresis curve in close proximity.

One factor which can influence the performance of the thermostat is fluid pressure acting on the valves. In this regard, fluid pressure within the engine jacket is normally higher than the pressure of fluid within the radiator system. This differential is primarily due to pressure exerted by the water pump which forces fluid through the engine jacket. When the engine is operated at high speeds, coolant flows through the engine jacket at a high rate and as a result the pressure is high within the engine system. Because of this pressure differential, the force required to open the thermostatic valve must overcome both the pressure within the engine as well as the force exerted by the valve's biasing spring. When the valve is eventually opened, often the valve is opened faster and to a larger extent than what is optimally required to cool the engine. Opening the thermostat valve to a degree larger than what is required is referred to as overshooting. Overshooting or excessive gain, is undesirable because too much coolant is allowed to flow through the valve and into the radiator and, as a result, the engine is cooled below the optimal operating temperature. As the engine cools, the heat sensitive device in the thermostat retracts and allows the biasing spring to close the valve of the thermostat. The repeated action of opening and closing of the thermostat without reaching an equilibrium is referred to as "thermal cycling", "gage cycling", "gage swing" or simply "cycling". Cycling is undesirable because, among other reasons, it interferes with the engine from operating at its optimal temperature and decreases the life of the thermostat. One consequence of an engine not operating at its optimal temperature is the creation of undesirable exhaust emissions.

One manner in which to address the problems of overshooting, excess gain and cycling is to reduce the pressure acting on the main valve. In this regard, prior art devices referred to as balanced thermostats were developed which were designed to equalize the pressure acting on the valve elements. Although the pressure acting on the valve is diminished, the valve itself is large and cannot open slow enough to avoid excessive gain sending too much coolant to the radiator. Although balanced thermostats have had some success in small engine applications, they still suffer from the problems of cycling and have not been able to adequately perform in larger engine applications such as in light trucks and vans.

A second approach to the problems associated with cycling and gain is to employ a controlled flow feature on the valve. Controlled flow features may involve the design of the surfaces of the valves so that in the initial stages of the stroke which displaces the valve from its respective seat, the flow of water through the main valve is maintained at a low and relatively constant rate. In later stages of the piston stroke, at a predetermined point, the valve is allowed to completely open and coolant can flow at its larger maximum rate. Although controlled flow features can improve the operating characteristics of the hysteresis curve, the pressure exerted on the main valve is largely unaffected by the feature. Further when the valve is used as a control, there is a risk that when the coolant is cold, a high excess pressure can be built up and cause damage.

Another ancillary approach to the pressure problems as mentioned above is the incorporation of jiggle pins or a bypass ball check valve in the system. The use of a ball check valve or jiggle pins are primarily intended to provide a manner in which to vent excess air trapped in the engine block during filling of the system, but to a limited extent they also can serve as a means to control minimum flow through a thermostatic valve.

Another approach to the problems associated with overshooting and cycling is the incorporation of a second smaller valve on the thermostatic device, sometimes referred to as a pilot valve. Pilot valves are designed to control flow of coolant allowing coolant to flow from the engine system to the radiator system. The opening of the pilot valve is designed to precede the opening of a main valve in response to an increase in temperature. A pilot valve allows for a low flow of water from the engine jacket to enter the radiator and begin to equalize the temperature between the two systems and serves to reduce pressure acting on the main valve. Because the area of the pilot valve is continuously smaller than the main valve, the pressure which must be overcome is commensurately less to open the pilot valve. The incorporation of a pilot valve thus can reduce some of the pressure acting on the larger main valve and facilitates the opening of the main valve. One such pilot valve of the prior art involves a valve responsive to high fluid pressure within the engine system. The pressure setting at which a pressure responsive valve unseats is usually determined by a spring which biases the valve element in a closed position. Pilot valves associated with heavy duty engines are rather complex and involve multiple biasing elements.

A further problem which can effect the performance of thermostats is caused by the presence of undesirable contaminants within the coolant system. One source of contaminants is from the casting process of the engine block which leaves small relics of core sand within the engine jacket. These particulates can be transported by the coolant flowing through the engine jacket and can lodge within the valves. Other particulate matter may enter the coolant system as a result of erosion or corrosion of engine parts. Regardless of their source, the presence of solid particulate matter in the system can interfere with the proper sealing of valve surfaces within the thermostat. Particulates may enter the valves but are to small to exit on the opposite side and as a result become lodged between the valve element and its respective seat. When the valve attempts to close, the particulate matter interferes with or prevents the surfaces from properly seating against one another. The problems with particulates are particularly of concern in connection with small valves and their respective fluid passages such as pilot valves.

The object of the present invention is to provide an improved thermostat particularly suitable for light trucks and vans which addresses the problems of overshooting and cycling. Another object of the invention is to provide a two stage thermostat having a secondary valve which improves the systems ability to maintain a relatively constant temperature within the engine system. A further object of the invention is to provide a thermostat having a secondary valve which mitigates interference of the valves by particulate matter.

SUMMARY OF THE INVENTION

The present invention involves an improved thermostatic valve device which employs a two stage poppett style valve to control flow of coolant from the engine jacket to the radiator system. The invention uses an annular main valve and an annular secondary valve which is concentrically located inside the main valve. The entrance to the secondary valve is adjacent to main valve which provides a relatively large entrance area and can accordingly introduce a relatively large volume of fluid to the valve. At the same time, the maximum opening of the secondary valve remains small thereby mitigating the problems presented by particulate matter such as core sand. The internal surfaces of the channel through the secondary valve are formed to encourage laminar flow. Although the opening of the secondary valve is directly adjacent to the main valve, the sealing surface of the secondary valve is located closer to the center of the thermostat. The exit of the secondary valve incorporates a control flow feature. By locating the annular sealing surface of the secondary valve close to the center of the thermostat, the effective area of the valve is diminished and the corresponding pressure exerted by coolant in the engine system is also reduced. This feature thus reduces the force which must be must overcome to open the secondary valve. The main valve and secondary valves are both biased in a closed position by a single compression spring and are sequentially opened in response to an increase in temperature within the engine. Once the secondary valve starts to open, the main valve is held closed only by the coolant pressure in the engine.

DETAILED DESCRIPTION

Figure 1:
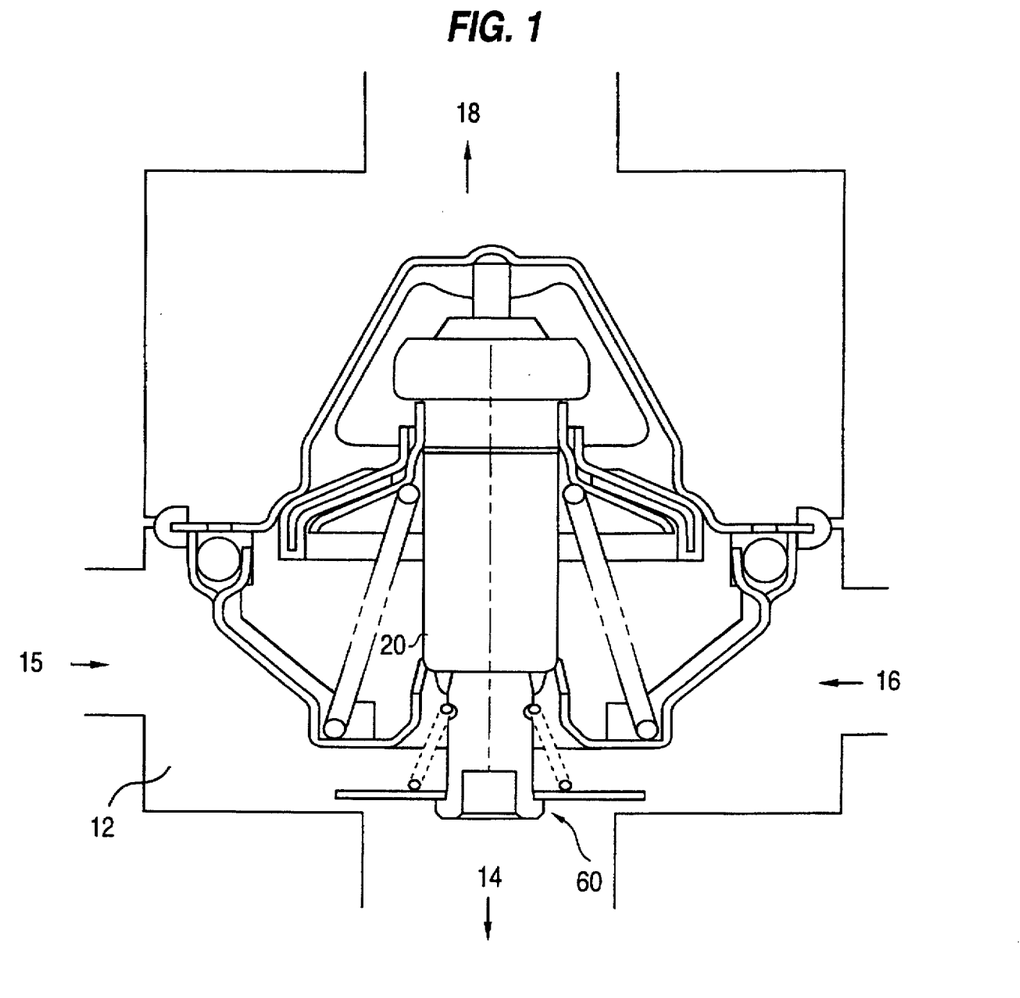
FIG. 1 is a schematic representation of a thermostat device according to the invention within a housing.

A thermostatic valve device according to the invention, generally designated by the reference numeral 10, is schematically shown in position in a housing 12 next to or in an engine block or jacket. The thermostat is particularly suitable for use in automobile and light truck cooling systems. Thermostat 10 controls the flow of coolant from the engine cooling jacket either to the radiator system or back to the engine block. When the main and secondary thermostatic valves are closed, coolant entering housing 12 from either incoming flow passages 15 or 16 is directed back to the engine block through passage 14. When the main and secondary valves are opened, coolant can flow through the valves and into the radiator system 18. When the main valve and secondary valves are opened, a third valve or bi-pass valve assembly 60 closes the passage 14 leading back to the engine block.

Figure 2:
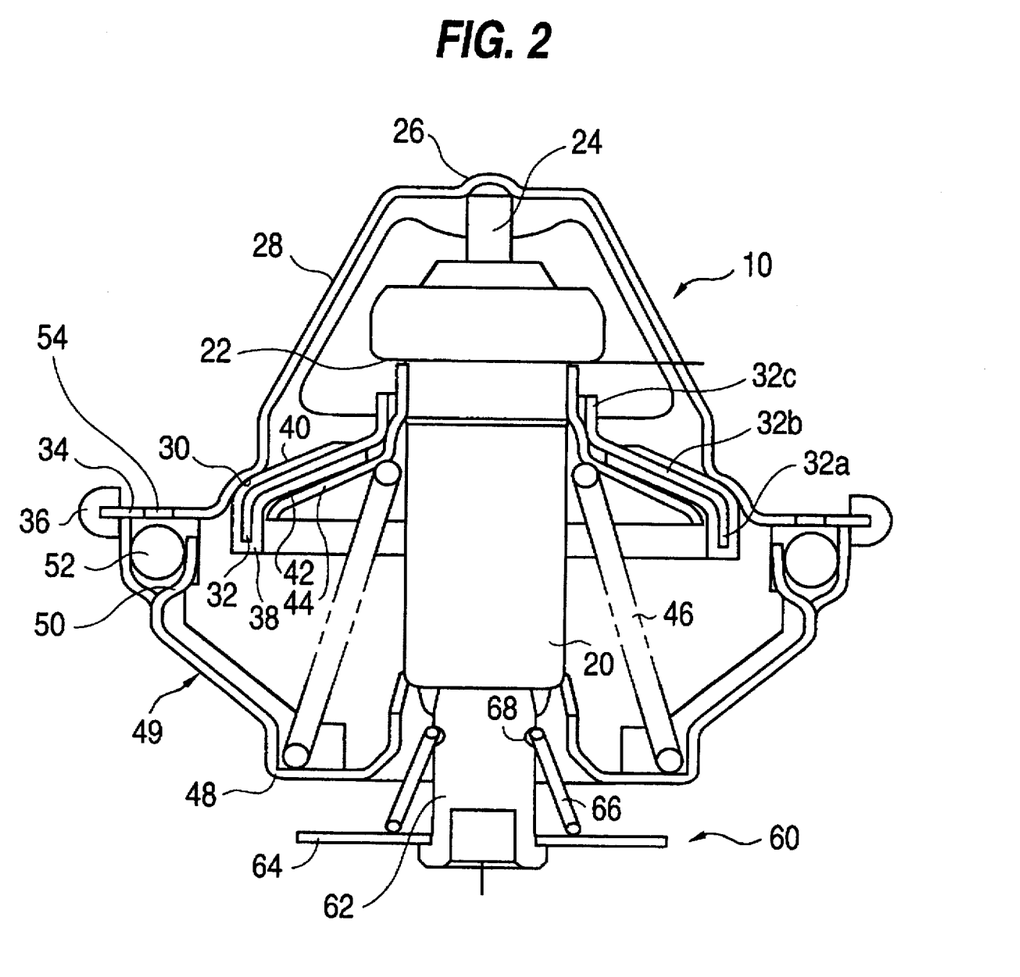
FIG. 2 is a sectional view of a first embodiment of a thermostatic according to the invention.

Referring now to FIG. 2, thermostat 10 is comprised of a central cylindrical body 20 having an integral shoulder 22 located at the upper end. Within cylindrical body 20 is a heat sensitive element, a diaphragm, cup and guide (not shown) which cooperate to open the valves. The heat sensitive element is preferably a pellet comprised of a wax blend formulated to expand and contract in response to changes in temperature. In response to an increase in temperature, the wax which is contained in the cup will expand causing the diaphragm to engage one end of piston 24 and extend it from the cylindrical body. In a preferred embodiment the cup and the guide are made of brass. The opposite end of piston 24 abuts the apex 26 of member 28. Annular surface 30 of member 28 serves as the seat for main valve 32. Surrounding thermostat 10 is an annular flange 34 covered by elastomeric gasket 36. "C" ring gasket 36 helps ensure a fluid tight seal between the housing 12 or cylinder head and the radiator system.

Main valve 32 is annular and provided on one end of the valve and continuing up both the interior and exterior surfaces is a coating 38 made from an elastomeric material such as rubber. Coating 38 is preferably formed of nitrile for protection against fuel oil contamination and for its ability to withstand heat created within the engine coolant system. The top coated surface 40 of main valve 32 faces the radiator and a portion thereof engages seat surface 30 to close the main valve. The opposite surface 42 is also coated and serves as the valve seat for secondary valve 44. Main valve 32 which surrounds central body 20, is made of a leading section 32a, a transition or middle section 32b and a trailing section 32c.

Secondary valve 44 is also annular, fits within the main valve and also is made up of three sections. Both the main valve 32 and secondary valve 44 are biased against their respective seats by coiled retaining compression spring 46. In this embodiment the compression spring 46 is conically tapered and the upper end of the coil bears directly against secondary valve element 44. The opposite lower end of spring 46 bears against spring retainer 48. Compressing spring 46 provides a predetermined biasing force on the valves and permits the valves to move to their open position only when the temperature reaches a predetermined temperature allowing piston 24 to provide a countervailing force against the spring and fluid pressure acting on the valves. In order to open the valves, piston 24 works against both the compression force of spring 46 and against any water pressure within the engine jacket system.

Spring retainer 48 has arms which extend downward from flange 34 which generally surround cylindrical body 20. Shown integrally formed within arm 49 of spring retainer 48 is a branch element 50 which extends towards the central body and provides a lateral restraining element for a ball check valve 52. Branch element 50 and arm 49, which has a "V shaped" axial profile, define the lateral dimensions of a cage which retains check ball 52. The branch element 50 is formed by cutting a "U" shaped slot through retainer 48 and bending the end portion towards the central body 20. The top of the cage is formed by flange 34. The ball check valve is a one way valve and allows small volumes of fluid to flow from the radiator system to the thermostat's housing area 12 through passage 54. The ball check valve prevents coolant from leaking through the thermostat into the radiator system and provides a vent to release air from the system during the filling operation.

The integration of the branch element 50 from spring retainer 48 reduces the cost of providing the ball check valve feature on the thermostat according to the invention. As an alternative to the ball check valve, a jiggle pin could be provided in this location.

At the bottom of cylindrical body 20 and extending beyond retainer 48 is third valve assembly 60. Valve assembly 60 comprises a stem 62 and annular sealing element 64 which can seat against the entrance to passage 14. A second coil spring 66 is provided to urge sealing element 54 against its respective seat which is located around the entrance to passage 14. The top of spring 64 is seated in shoulder 68 formed around stem 62. As shown in FIG. 1 valve 60 is in an open position and the main and secondary valves of the thermostat are closed. During cold engine conditions such as during engine warm-up, the valves are in the positions as shown in FIG. 1 and coolant from the engine jacket flows from passages 15 and 16, into the housing area 12 and then exits through passage 14 to be directed back to the engine jacket. When the coolant in the engine jacket reaches a predetermined temperature, the wax within the cup begins to expand thereby causing the diaphragm to displace piston 24 from the central cylinder. Because the end of the piston is seated at apex 26, the piston forces central body 20 downward and away from member 28. The extension of piston 24 will cause sealing element 64 to close passage 14.

Figure 3:
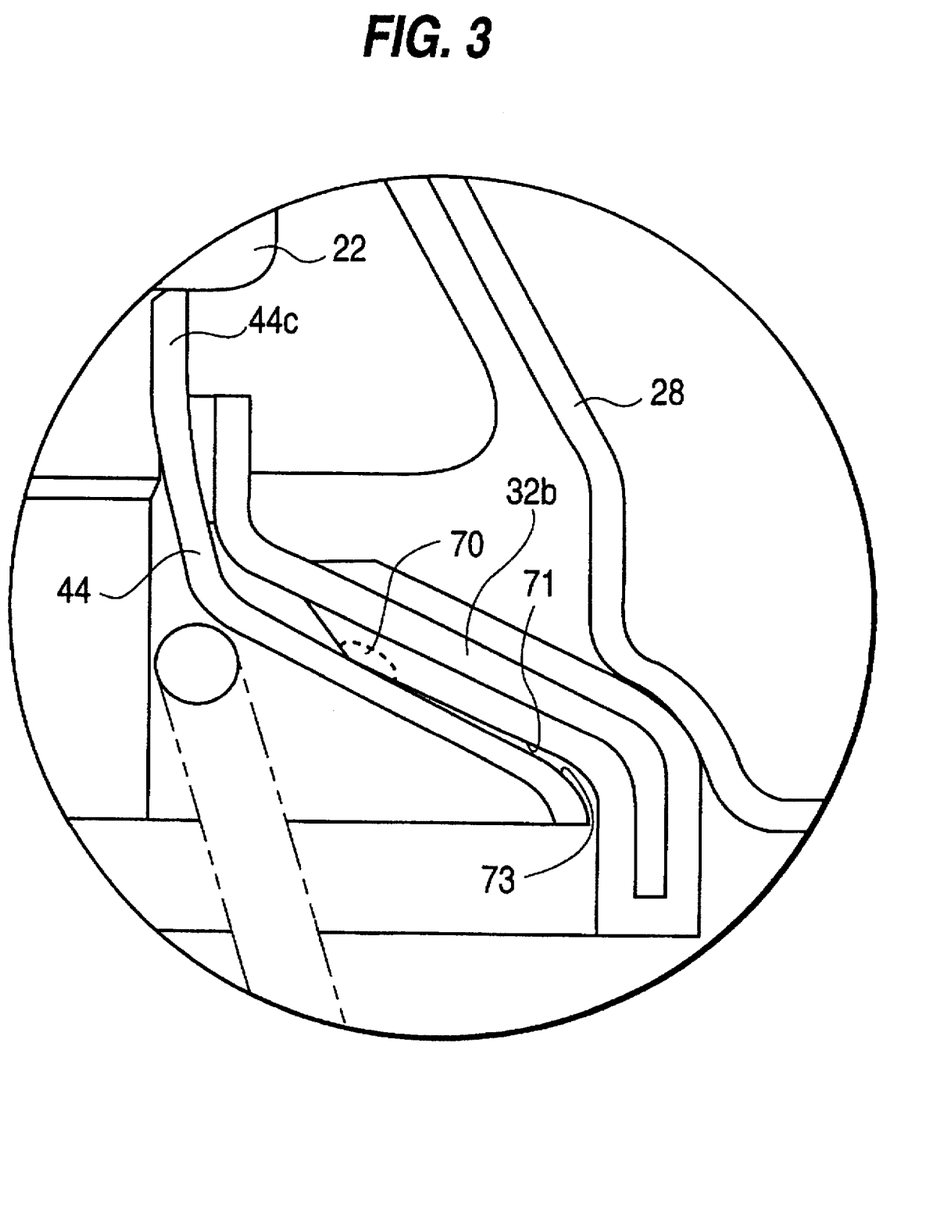
FIG. 3 is an enlarged sectional view of a portion of a thermostat of FIG. 2 with the main and secondary valves in their respective closed positions.
Figure 4:
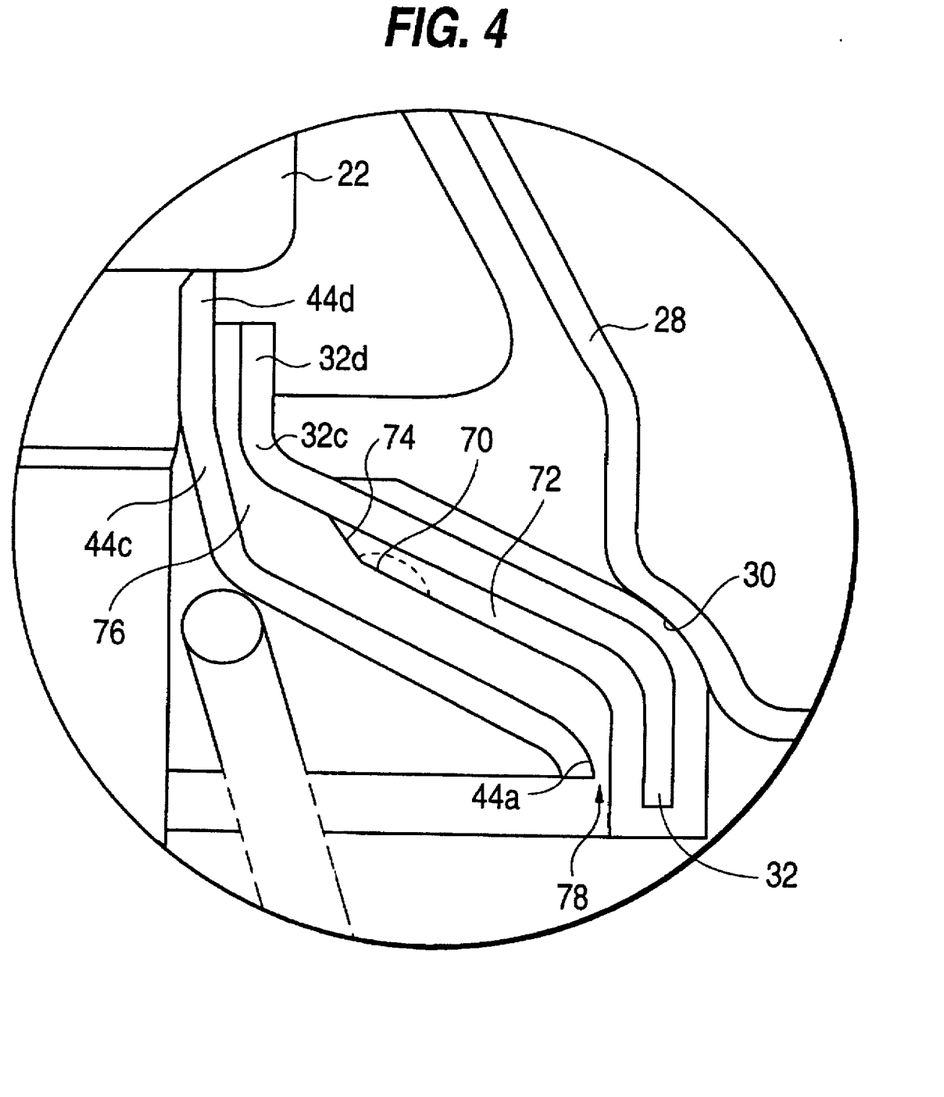
FIG. 4 is an enlarged sectional view of a portion of the thermostat of FIG. 2 showing the secondary valve in an open position.

Now referring to FIG. 3, as the piston is displaced by the diaphragm, shoulder 22 engages trailing section 44d of secondary valve 44. As the piston continues its stroke, the secondary valve is lifted from its seat area 70 and the valve is opened. Surface 71 of middle section 32b and surface 73 of middle section 44d gradually taper towards each other to the sealing area. The surfaces 71 and surface 73 are oriented with respect to each other at an angle of approximately 1.5 degrees. The seal of the second valve is formed near the center of the thermostat. FIG. 4 shows the secondary valve in an open position. In this position some coolant is allowed to pass through the valve into the radiator system. In a preferred embodiment the secondary valve is designed to allow a maximum flow rate of approximately 5 gallons per minute. This rate can be established by incorporating a controlled flow feature at the exit 76 of the valve channel.

As best seen in FIG. 4, the main valve is covered with coating 72 made from rubber, the thickness of which tapers at area 74 so as to provide a smooth and continuous surface within the channel of the secondary valve. The control flow section 44c is formed in relation to radius section 32d to incorporate a controlled flow feature at the exit 76. The surfaces which define the channel in the secondary valve are formed to encourage laminar flow through the valve. The entrance 78 to the secondary valve is also formed to remain at a constant dimension as the valve is opened. In a preferred embodiment, the distance from leading edge 44a of secondary valve to the rubber coating on main valve 32 which defines entrance 70 is 0.015 inches. Maintaining this dimension at 0.015 inches minimizes the potential for introduction of undesirable particulate matter into valve. Very small particles which enter the valve are able to exit through the larger exit 76. When the secondary valve 44 is opened, the main valve 32 is maintained in a closed position by the fluid pressure within the engine system. Operation of the secondary valve control flow opening 76 provides low flow gain which reduces thermal cycling of the engine coolant system. The opening of the secondary valve also allows pressure to be relieved from the main valve which reduces the tendency to overshoot. With the pressure relieved from the engine side of the main valve the opening is much more controlled.

Figure 5:
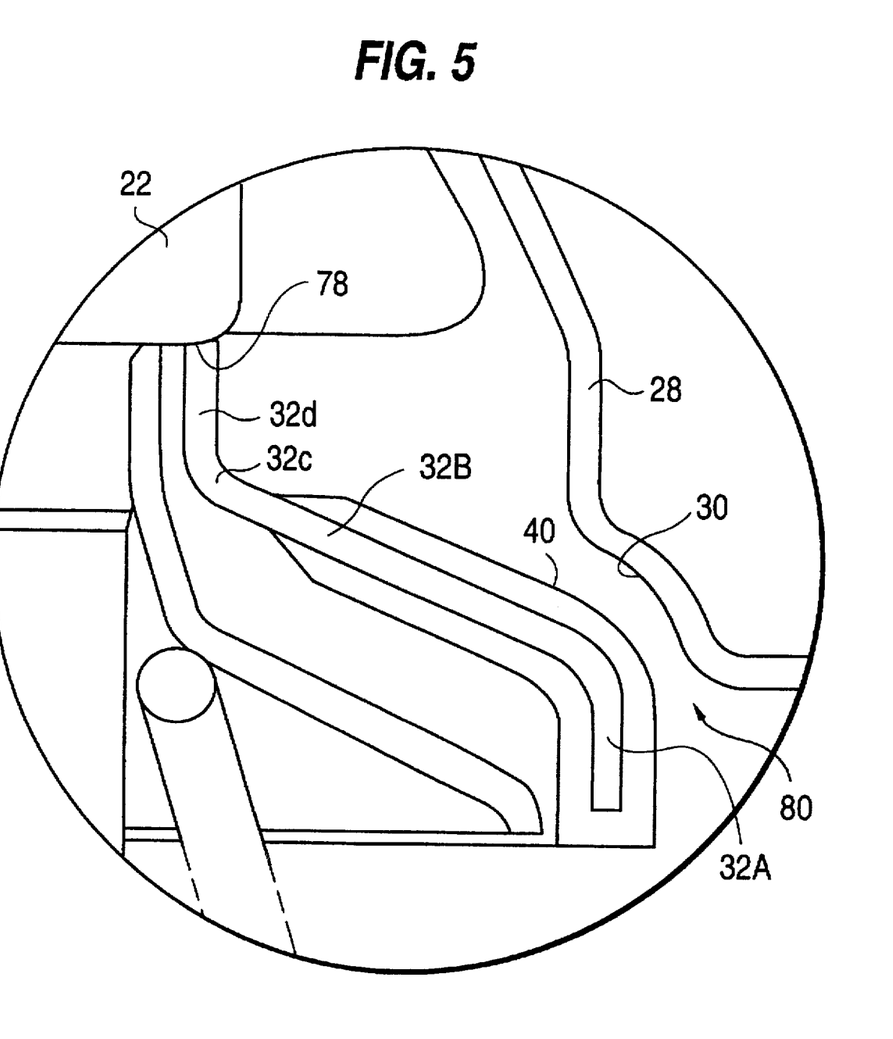
FIG. 5 is an enlarged sectional view of a portion of the thermostat of FIG. 2 showing the main valve in an open position.

As shown in FIG. 5, the continued stroke of piston 24 allows shoulder 22 to engage the trailing edge 32d of main valve 32 and open the main valve. In an open position, the surface 40 of the main valve is displaced from its seat 30 allowing fluid to flow through channel 80. The trailing edge 32d of the main valve has passages (not shown) to allow for flow through the secondary valve channel even when the main valve is opened. It is contemplated that the main valve will only open as depicted herein in catastrophic circumstances, such as when the temperature of coolant within the engine system approaches a magnitude where it can damage the engine block or engine components such as the thermostat itself. The majority of the coolant flow and regulation of temperature in the system will performed by the secondary valve.

Figure 6:
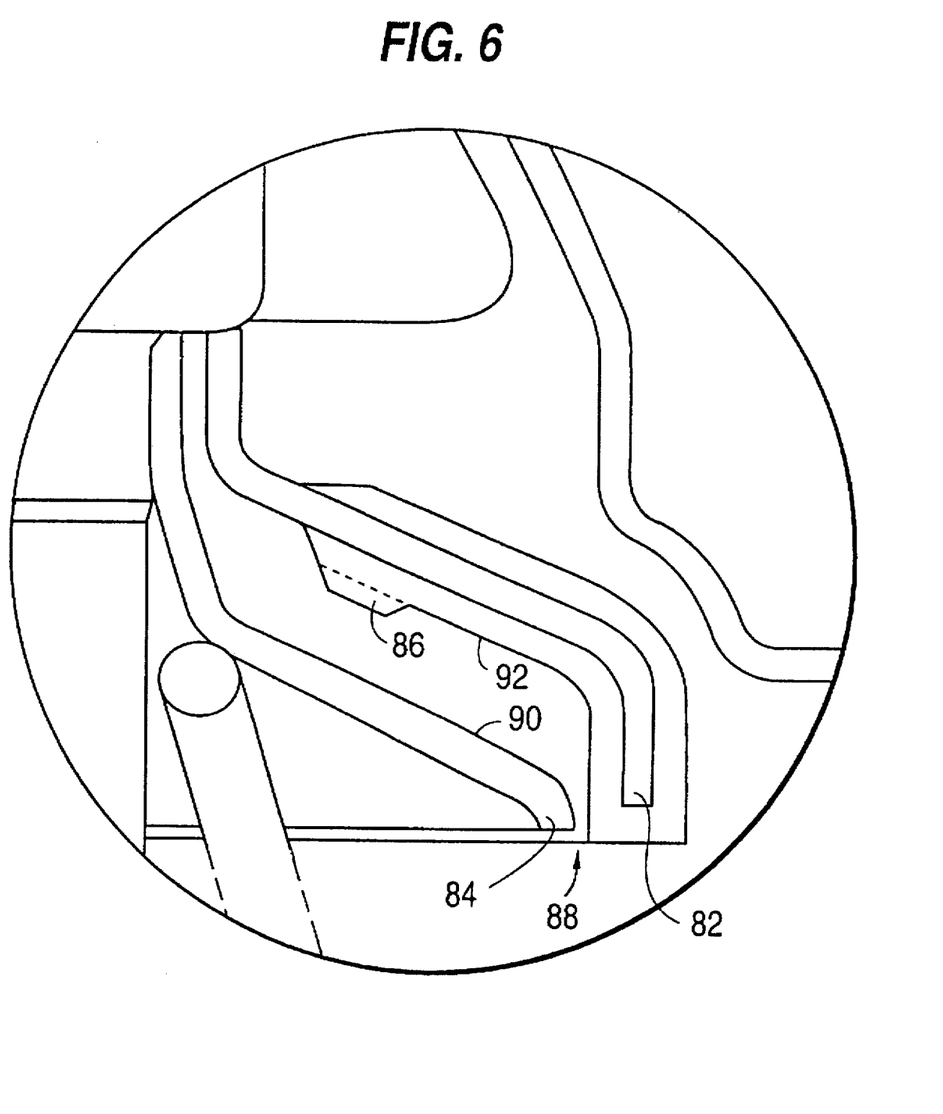
FIG. 6 depicts an enlarged view of the valve surfaces of a second embodiment of the thermostat showing the secondary valve in an open position.

FIG. 6 shows an enlarged view of an alternative embodiment of the invention with both the main valve 82 and the secondary valve 84 in an open position. In this embodiment, an annular projection 86 extends from the surface of the coating near the upstream end of the coating. In this embodiment the respective angular relationship between the middle section of the main valve and the middle section of the secondary valve is less critical because the seal formed between the secondary valve and its seat area is located at projection 86. Projection 86 is formed close to the center of the thermostat and thereby reduces the effective surface area and the concomitant force exerted on the secondary valve by fluid within the engine jacket system. Another feature of this embodiment is an improved ability to keep the secondary valve open against the fluid pressure in the engine. Once the valve is opened, fluid flows through opening 88 and through the channel defined by surfaces 90 and 92. Although in the embodiment depicted in FIG. 6 the projection has a trapezoidal profile, it is contemplated that the projection could take the form of other shapes such as, square, semicircular, semi-elliptical or other rounded shapes.

The foregoing description is considered as illustrative only of the principles of the invention. Since numerous modifications and changes will be apparent to those skilled in the art, the invention is not limited to the exact operation shown and described herein. Thus the scope of the invention is defined only by the terms of the following claims and art recognized equivalents thereof.

We claim:

1. A thermostatic valve device for control of the flow of coolant from an internal combustion engine to a radiator system comprising, a temperature sensitive element contained in a body from which a piston may be axially moved with respect to said body in response to a change in temperature, and engaging means on said body, a main valve and a main valve seat, said main valve having a leading section and a trailing section, a first side and a second side, said first side biased against said main valve seat by a compression spring to form a seal, a second valve and a second valve seat, said second valve having a leading section, a trailing section, a first side and a second side, said second valve seat located on said second side of said main valve, said second valve biased against said second valve seat by said compression spring to form a second seal, said compression spring seated on a spring retainer, wherein in response to an increase in temperature said piston moves from said body thereby first causing said engaging means to engage said trailing edge of said second valve and unseat said second valve from said second valve seat and compress said compression spring, and wherein in response to a further increase in temperature said engaging means engages said trailing edge of said main valve thereby unseating said main valve from its seat to open the valve and thereby further compressing said compression spring.

2. The thermostat as recited in claim 1 wherein said main and said second valves are annular.

3. The thermostat as recited in claim 1 wherein said engaging means is an annular shoulder formed around said body.

4. The thermostat as recited in claim 1 wherein said temperature sensitive element is a wax.

5. The thermostat recited in claim 1 further comprising an extension element, extending from said main valve seat and providing an abutment area to receive a distal end of said piston.

6. The thermostatic device as recited in claim 1 further comprising an elastomeric coating covering said leading section and extending down said main and said second sides of said main valve wherein said coating on the said first side seats against said main valve seat and said coating on said second side serves as the seat for said second valve.

7. The thermostatic device recited in claim 6 wherein said elastomeric coating is made of rubber.

8. The thermostatic device as recited in claim 1 wherein the leading section of said second valve is positioned approximately 0.015 inches from said second surface of said main valve thereby providing an annular opening into said second valve having a radial dimension of approximately 0.015 inches.

9. The thermostatic device as recited in claim 1 wherein said main valve and said second valve further comprise a middle section and said middle section of said main valve serves as the seat for said second valve, and said middle section of said second valve is positioned at a 1.5 degree angle with respect to its respective seat.

10. The thermostatic device as recited in claim 6 wherein the thickness of said rubber coating on said second surface gradually tapers to nothing thereby defining a relatively smooth continuous surface which promotes laminar flow through said second valve.

11. The thermostatic device as recited in claim 1 wherein the control flow section of the secondary valve relative to the radius section of the main valve defines the predetermined low flow gain through the second valve.

12. The thermostatic device as recited in claim 1 further comprising a third valve for controlling the flow of fluid from a housing area containing said thermostat to cooling passages within an engine jacket.

13. The thermostatic device as recited in claim 1 further comprising controlled flow means within said secondary valve.

14. The thermostatic device as recited in claim 1 further comprising means to vent air through said thermostat but prevent the flow of liquid.

15. The thermostatic device as recited in claim 13 wherein said means to vent air comprises a ball check valve provided adjacent to said main valve seat.

16. The thermostatic device as recited in claim 14 wherein and said ball check valve is retained in a cage integrally formed from a spring retainer and an extension element from the main valve seat.

17. The thermostatic device as recited in claim 12 wherein said third valve is mounted on said body and controlled by said piston.

18. The thermostat as recited in claim 1 wherein said second side of said main valve and said first side of said second valve define a channel through said second valve when said second valve is displaced from its said seat and fluid flowing through said channel provides a force against the second side of said main valve to help maintain said main valve in a position to provide said channel.

19. The thermostat as recited in claim 17 wherein said means to direct fluid further comprises a raised annular section on the second side of said main valve.

20. The thermostat recited in claim 18 wherein said raised annular section is comprised of an elastomeric material.

21. The valve device as recited in claim 18 wherein said means to direct fluid further comprises said valve seat for said second valve.

* * * * *